United States Patent
He et al.

(10) Patent No.: US 8,491,200 B2
(45) Date of Patent: Jul. 23, 2013

(54) OPTICAL CONNECTOR WITH A PROTECTING MECHANISM FOR PROTECTING AN OPTICAL MODULE THEREOF

(75) Inventors: Jia-Yong He, Kunshan (CN); Qi-Sheng Zheng, Kunshan (CN); Hao Gu, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 510 days.

(21) Appl. No.: 12/767,789

(22) Filed: Apr. 26, 2010

(65) Prior Publication Data
US 2010/0272404 A1    Oct. 28, 2010

(30) Foreign Application Priority Data
Apr. 27, 2009 (CN) .......................... 2009 1 0301858

(51) Int. Cl.
*G02B 6/36* (2006.01)
(52) U.S. Cl.
USPC ............................................. 385/94; 385/139
(58) Field of Classification Search
USPC .................................................. 385/94, 139
See application file for complete search history.

(56) References Cited

U.S. PATENT DOCUMENTS

| | | | | |
|---|---|---|---|---|
| 2,861,366 A * | 11/1958 | Denison | ............................ | 49/269 |
| 4,787,706 A * | 11/1988 | Cannon et al. | .................... | 385/59 |
| 5,080,461 A * | 1/1992 | Pimpinella | ...................... | 385/65 |
| 5,964,600 A * | 10/1999 | Miles et al. | .................... | 439/140 |
| 6,340,304 B1 * | 1/2002 | Jones et al. | .................... | 439/138 |
| 6,368,150 B1 * | 4/2002 | Zheng et al. | ................ | 439/541.5 |
| 6,461,054 B1 * | 10/2002 | Iwase | ................ | 385/73 |
| 6,652,152 B2 * | 11/2003 | Yang et al. | ...................... | 385/53 |
| 6,688,780 B2 * | 2/2004 | Duran | ............................ | 385/76 |
| 6,845,210 B2 * | 1/2005 | Ohbayashi et al. | ............ | 385/139 |
| 6,866,424 B2 * | 3/2005 | Tanaka et al. | .................... | 385/55 |
| 7,413,351 B2 * | 8/2008 | Ozawa et al. | .................... | 385/53 |
| 7,507,032 B2 * | 3/2009 | Katagiyama et al. | ............ | 385/73 |
| 8,186,890 B2 * | 5/2012 | Lu | .................... | 385/60 |
| 8,251,592 B2 * | 8/2012 | Wu | .................... | 385/74 |
| 2003/0103732 A1 * | 6/2003 | Yang et al. | ...................... | 385/76 |
| 2004/0052472 A1 * | 3/2004 | Roth et al. | ...................... | 385/56 |
| 2004/0062486 A1 * | 4/2004 | Tanaka et al. | .................... | 385/55 |

(Continued)

FOREIGN PATENT DOCUMENTS

| | | |
|---|---|---|
| JP | 3135572 U | 9/2007 |
| TW | M324318 U | 12/2007 |
| WO | 2008/121731 | 10/2008 |

*Primary Examiner* — Charlie Peng
*Assistant Examiner* — Peter Radkowski
(74) *Attorney, Agent, or Firm* — Wei Te Chung; Ming Chieh Chang (57) ABSTRACT

An optical connector defining a receiving space for receiving a corresponding plug includes an insulative housing, an optical module mounted to the insulative housing, and a protecting mechanism assembled into the receiving space. The insulative housing has a front surface at a rear side of the receiving space. The optical module has a light receiving element located behind the front surface and forwardly exposed to the receiving space. The protecting mechanism has a door lying in a vertical plane in front of the front surface to shield the light receiving element along an insertion direction when the plug is not inserted into the receiving space, and moving downwardly out of the receiving space to unveil said light receiving element in said insertion direction when the plug is inserted into the receiving space.

20 Claims, 7 Drawing Sheets

U.S. PATENT DOCUMENTS

| | | | |
|---|---|---|---|
| 2007/0098330 A1* | 5/2007 | Ozawa et al. | 385/76 |
| 2007/0154138 A1* | 7/2007 | Dames et al. | 385/19 |
| 2008/0026640 A1* | 1/2008 | Zheng et al. | 439/626 |
| 2010/0080519 A1* | 4/2010 | Ko et al. | 385/93 |

* cited by examiner

OPTICAL CONNECTOR WITH A PROTECTING MECHANISM FOR PROTECTING AN OPTICAL MODULE THEREOF

BACKGROUND OF THE INVENTION

1. Field of the Invention

The present invention relates to optical connectors, more particularly to optical connectors with a protecting mechanism to protect an optical module thereof from being covered by dust.

2. Description of Related Art

WO. Patent Publication No. 2008/121731 A1 discloses an optical connector designed with a plurality of optical fibers to increase signal transmission speed of a standard USB connector. The optical connector defines a mating port to receive a corresponding plug, and includes an insulative housing, a plurality of contacts retained in the housing to transmit electrical signals, and a plurality of optical fibers to transmit optical signals for increasing signal transmission speed. The housing has a tongue extending forwardly into the mating port. The tongue defines a plurality of slots at a lower side thereof. The contacts include contact portions catileveledly received in the slots. The optical fibers have light receiving elements located below the tongue and forwardly exposed into the mating port to mate with the plug. However, when the optical connector does not mate with the plug, the light receiving elements of the optical fibers are exposed to the exterior, which easily cause the light receiving elements being covered by dust, and then the optical connector can not transmit optical signals stably.

Hence, an improved optical connector is desired to overcome the above problems.

BRIEF SUMMARY OF THE INVENTION

According to one aspect of the present invention, an optical connector defining a receiving space for receiving a corresponding plug, comprises: an insulative housing having a front surface at a rear side of the receiving space; an optical module mounted to the insulative housing, the optical module having a light receiving element located behind the front surface and forwardly exposed to the receiving space; a protecting mechanism assembled in the receiving space, the protecting mechanism having a door lying in a vertical plane in front of the front surface to shield the light receiving element along an insertion direction when the plug is not inserted into the receiving space, and moving downwardly out of the receiving space to unveil said light receiving element in said insertion direction when the plug is inserted into the receiving space.

According to another aspect of the present invention, an optical connector comprises: a metal shell covering the insulative housing and forming a receiving space with the tongue; an optical module retained on the insulative housing and having a light receiving element located at one side of the tongue and forwardly exposed to the receiving space; and a protecting mechanism located at a front side of the light receiving element to protect the light receiving element from being covered by dust; wherein the protecting mechanism comprises a door covering the light receiving element and a slider engaging with the door and protruding into the receiving space upwardly, the slider can be pressed to rotate downwardly along a clockwise direction to drive the door moving downwardly out of the receiving space in an insertion process of a corresponding plug.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Reference will be made to the drawing figures to describe the present invention in detail, wherein depicted elements are not necessarily shown to scale and wherein like or similar elements are designated by same or similar reference numeral through the several views and same or similar terminology.

Referring to FIGS. 1-7, an optical connector 100 for soldering to a circuit board (not shown) according to the present invention is disclosed. The optical connector 100 can mate with an USB 2.0 plug or an optical plug (not shown). The optical connector 100 comprises an insulative housing 1, a plurality of contacts 2 and an optical module 3 retained in the insulative housing 1, a protecting mechanism 4 assembled to the insulative housing 1 to protect the optical module 3, a metal shell 5 and a rear shell 6 covering the insulative housing 1. The optical connector 100 defines a receiving space 7 between the insulative housing 1 and the metal shell 5 for receiving the USB 2.0 plug or the optical plug.

Figure 1:
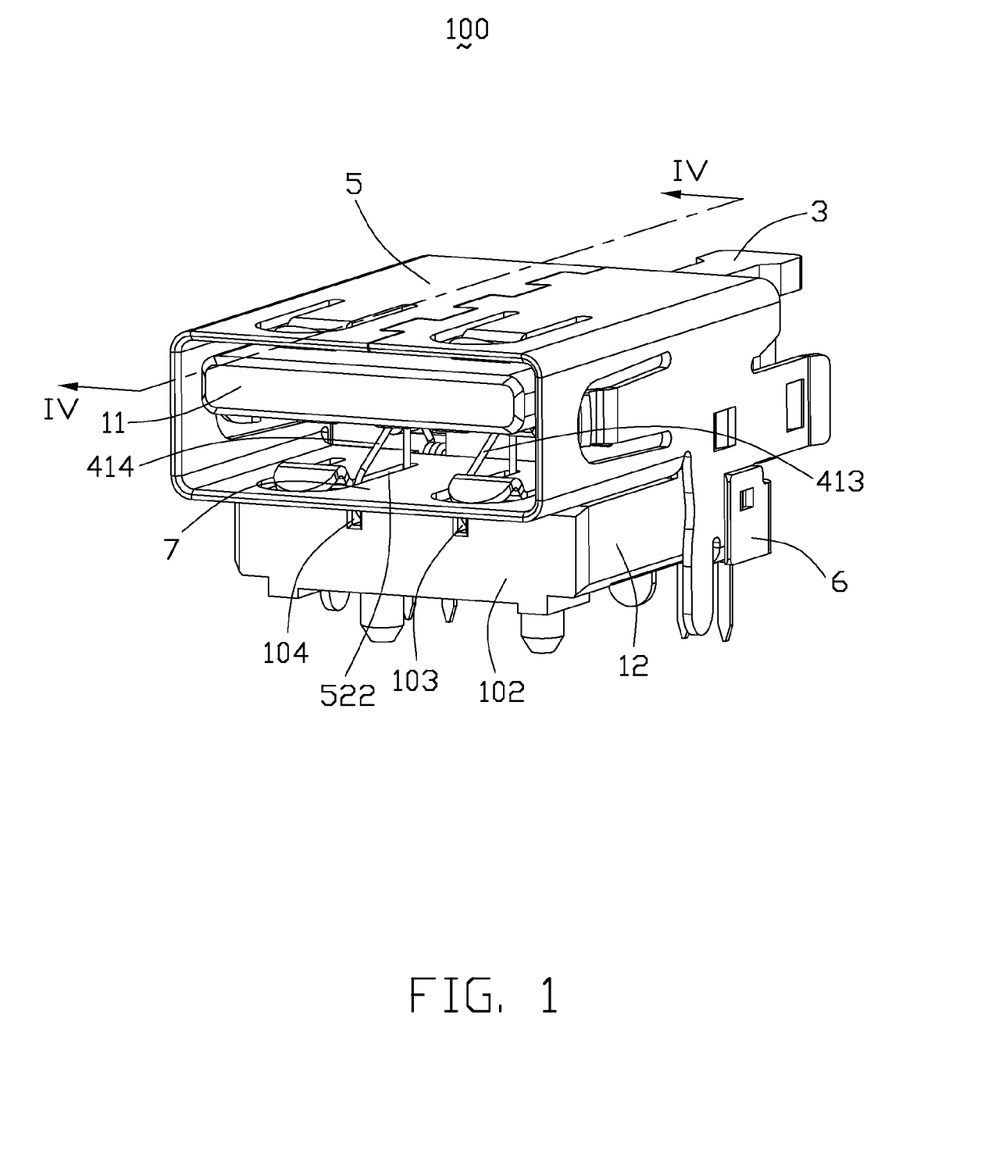
FIG. 1 is a perspective view of an optical connector according to the present invention.
Figure 2:
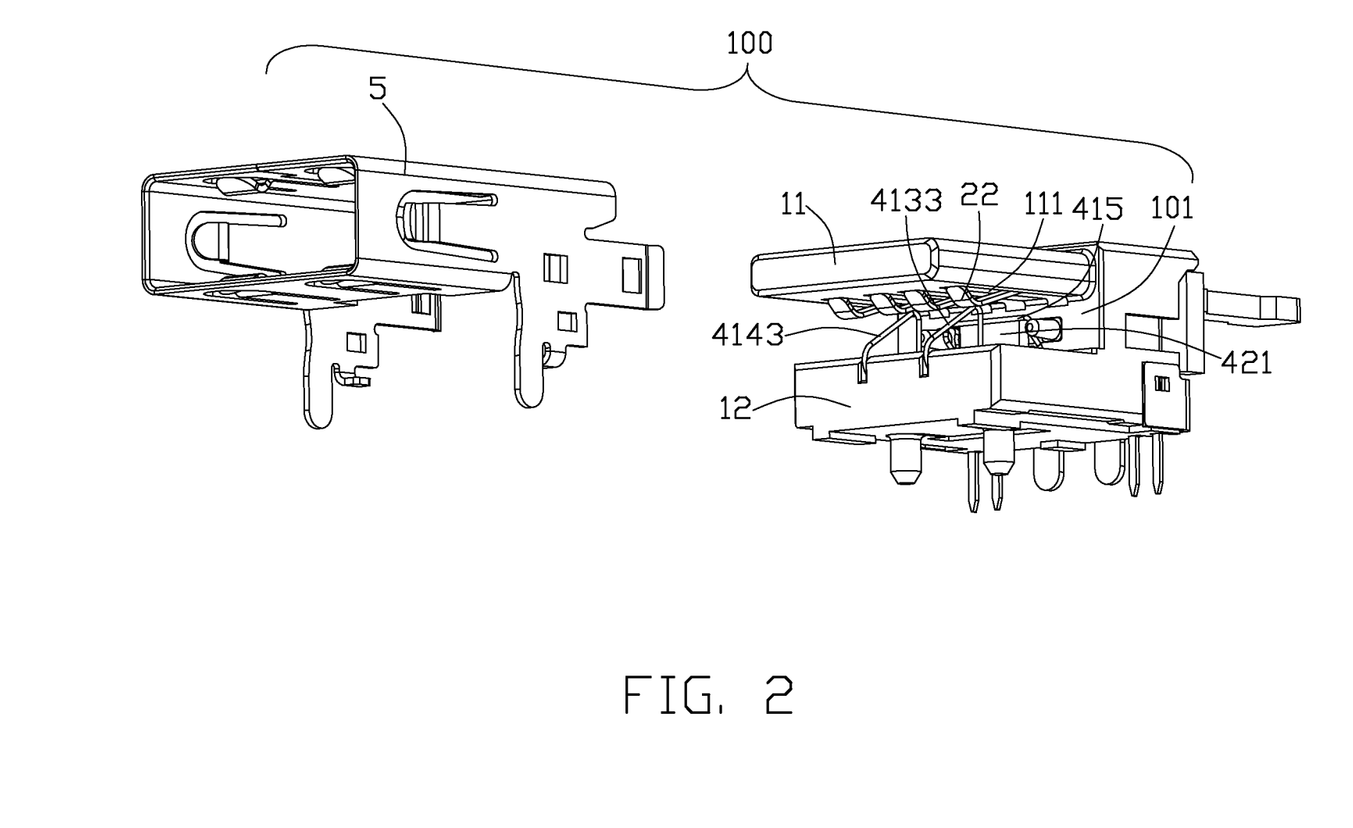
FIG. 2 is a partly exploded view of the optical connector shown in FIG. 1.
Figure 3:
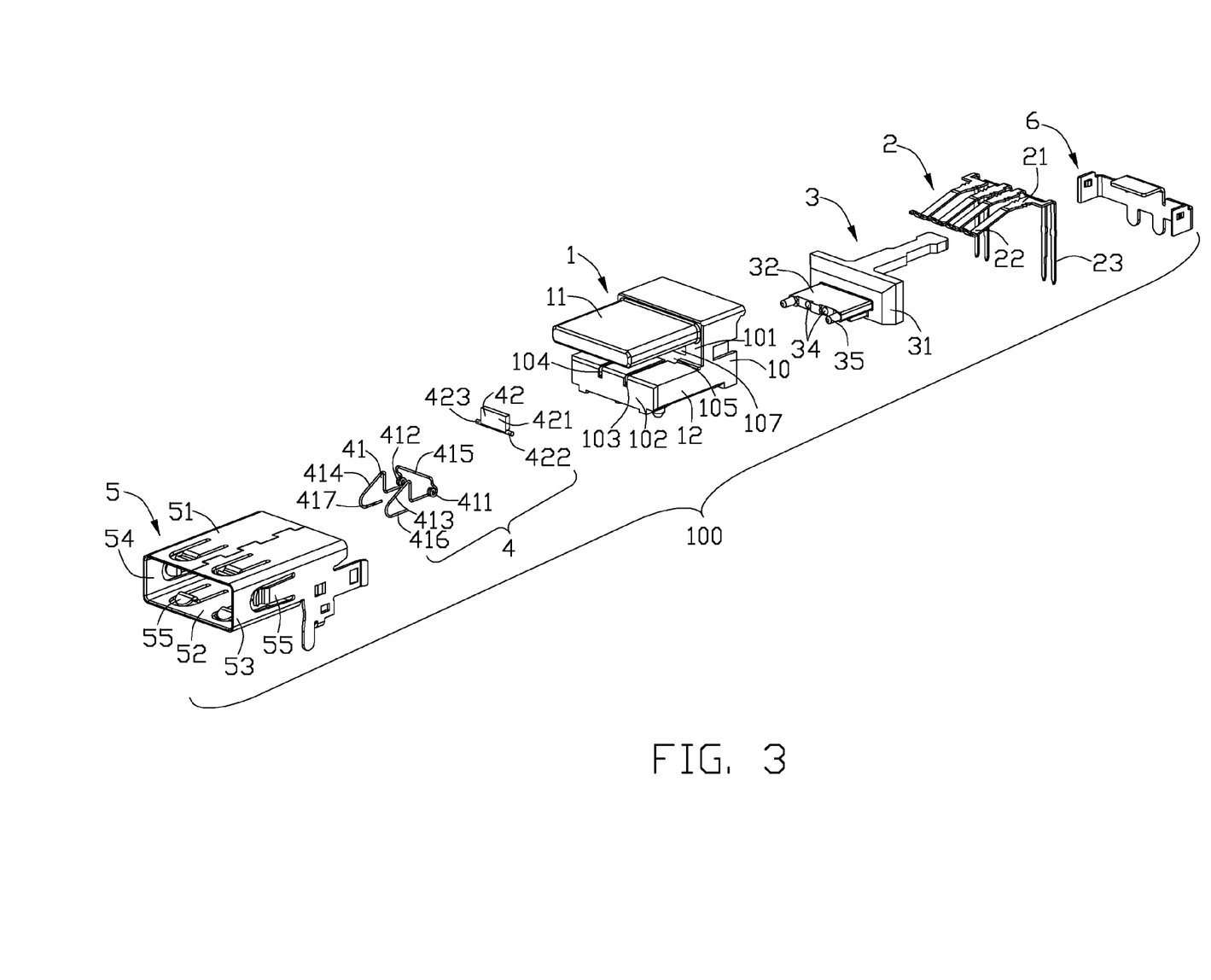
FIG. 3 is an exploded view of the optical connector shown in FIG. 1.

Referring to FIGS. 2 and 3, the insulative housing 1 has a base portion 10 located at a rear side of the receiving space 7, a tongue 11 and a standoff 12 extending forwardly from upper and lower side of a front surface 101 of the base portion 10 respectively. The front surface 101 is located at a rear side of the receiving space 7 and forwardly faces to the receiving space 7. The tongue 11 extends to the receiving space 7. The standoff 12 is located below the receiving space 7. The standoff 12 defines a pair of first and second slots 103, 104 extending backwardly from a front wall 102 thereof, a mounting slot 105 located at a front side of the mating face 101, and a receiving cavity 106 below the mounting slot 105. The receiving cavity 106 is located at a rear end of the standoff 12 and extends through the standoff 12 along the vertical direction. The receiving cavity 106 the mounting slot 105 and the receiving space 7 communicate with each other along a vertical direction.

The base portion 10 defines an opening 107 extending therethrough along an insertion direction of the optical plug to receive the optical module 3. The opening 107 is located below the tongue 11 and neighbored with the receiving space 7 along the insertion direction. The tongue 11 defines a plurality of passageways 111 recessed from a lower surface thereof to receive the contacts 2.

The contacts 2 comprise a pair of differential signal contacts, a grounding contact and a power contact at two sides of the differential signal contacts which are similar to contacts of a standard USB 2.0 receptacle (not shown) and can transmit USB signals. Each contact 2 has a retaining portion 21 positioned in the base portion 10, a contact portion 22 extending forwardly from a front end of the retaining portion 21, and a tail portion 23 extending outwardly and downwardly from a rear end of the retaining portion 21. The contact portions 22 are cantileveldly received in the passageways 111 of the tongue 11 and can move along the vertical direction. An arrangement of the contacts portions 22 on the tongue 11 is same to that of the standard USB 2.0 receptacle (not shown), thereby the optical connector 100 can mate with the standard USB 2.0 plug.

The optical module 3 is retained in the opening 107 to increase signal transmission speed of the standard USB 2.0 receptacle. The optical module 3 has a body portion 31 retained at a rear side of the insulative housing 1 and a mating portion 32 extending forwardly into the opening 107 from a front side of the body portion 31. The mating portion 32 has a pair of positioning posts 35 extending forwardly into the receiving space 7 from two sides of a front end thereof, and a pair of light receiving elements 34 between the positioning posts 35 and forwardly exposed to the receiving space 7. The positioning posts 35 are used to mate with a pair of holes of the optical plug for assuring a stable connection between the optical connector 100 and the optical plug. The light receiving elements 34 does not extend forwardly beyond the front surface 101. The mating portion 32 is located below and behind the tongue 11 to make the contact portions 22 and mating portion 32 transmit signals in two parallel levels along the vertical direction. Of course, the mating portion 32 of the optical module 3 can be positioned at an upper, left or right side of the tongue 11.

Referring to FIGS. 3-7, the protecting mechanism 4 is retained on the insulative housing 1, and is arranged in front of the tail portions 23 along the insertion direction and located between the tail portions 23 along a transverse direction. The protecting mechanism 4 comprises a slider 41 retained in the insulative housing 1 and a door 42 engaging with the slider 41.

The slider 41 is made of metal material and has a pair of first and second coil portions 411, 412 at two sides thereof, a pair of first and second abutting sections 413, 414 extending forwardly from a front end of the first and second coil portions 411, 412 and a resisting portion 415 extending upwardly from a rear end of the first and second coil portions 411, 412. The resisting portion 415 presents as a reversed U-shape to resist a front side of the door 42, thereby the door 42 is sandwiched between the resisting portion 415 and the front surface 101 along the insertion direction. The first abutting section 413 has a first oblique portion 4133 obliquely protruding into the receiving space 7, a first positioning portion 416 horizontally extending backwardly from a front end of the first oblique portion 4133 to be positioned in the first slot 103, and a first connecting portion connecting the first oblique portion 4133 and the first coil portion 411 together. The first connecting portion in the present invention has a first level portion 4131 extending horizontally and forwardly from the first coil portion 413 and a first vertical portion 4132 extending upwardly from a front end of the first level portion 4131. The first oblique portion 4133 obliquely extends forwardly and downwardly from a top end of the first vertical portion 4132. Of course, the first connecting portion can be designed to be an inclined lever directly connecting the first oblique portion 4133 and the first coil portion 411 together along an inclined direction.

The second abutting section 414 has a structure same to that of the first abutting section 413, thereby the first and second abutting sections 413, 414 are symmetrically located at two sides of the slider 4. The second abutting section 414 has a second level portion 4141 extending horizontally and forwardly from the second coil portion 412, a second vertical portion 4142 extending upwardly from a front end of the second level portion 4141, a second oblique portion 4143 obliquely extending forwardly and downwardly from a top end of the second vertical portion 4142, and a second positioning portion 417 horizontally extending backwardly from a front end of the second oblique portion 4143 to be positioned in the second slot 104. The second level portion 4141 and the second vertical portion 4142 are formed as a second connecting portion connecting the second oblique portion 4143 and the second coil portion 412 together. Of course, the second connecting portion also can be designed to be an inclined lever directly connecting the second oblique portion 4143 and the second coil portion 412 together along an inclined direction.

The first and second oblique portions 4133, 4143 are located at a common inclined plane and protrude into the receiving space 7 to abut against the plug. The first and second positioning portions 416, 417 are parallel to the first and second level portions 4131, 4141 and spaced apart from the first and second level portions 4131, 4141 along both the insertion direction and the vertical direction. The first and second abutting sections 413, 414 lie in two vertical planes respectively which are all perpendicular to the front surface 101. The first abutting section 413 is parallel to the second abutting section 104. The first and second positioning portions 416, 417 are received in the first and second slots 103, 104 below the receiving space 7 respectively to position the slider 41 to the insulative housing 1, and prevent the whole slider 41 from moving downwardly when the USB 2.0 plug or the optical plug is inserted into the receiving space 7 and presses the oblique portions 4133, 4143 downwardly.

The door 42 has a shield portion 421 lying in a vertical plane to joint against the front surface 101 along the insertion direction and a pair of first and second pivots 422, 423 extending outwardly from two sides of a lower end of the shield portion 421. In assembly, ringing the first and second coil portion 411, 412 on the first and second pivots 422, 423 respectively; then assembling the whole of the protecting mechanism 4 to the insulative housing 1, the first and second coil portions 411, 412 and the first and second pivots 422,423 are received in the mounting slot 105 and can not move along both the insertion direction and a transverse direction of the insulative housing 1; the first and second positioning portions 416, 417 are received in the first and second slots 103, 104 and resist inner lower walls of the first and second slots 103, 104; the resisting portion 415 resists a front side of the shield portion 421 to make the shield portion 421 lie in a vertical plane and abut against the front surface 101 along the insertion direction, therefore, the light receiving element can be covered and protected from being covered by dust or destroyed by other thing; the first and second abutting sections 413, 414 protrude into the receiving space 7 and are located at a front side of the door 42.

The metal shell 5 has a pair of opposed top wall 51 and bottom wall 52, and a pair of opposed side walls 53, 54 which surround the tongue 11 and formed the receiving space 7 therebetween. The bottom wall 52 defines a cutout 521 at a rear middle side thereof, and a pair of slits 522 extending along the insertion direction to make the oblique portions 4133, 4143 extending therethrough to the receiving space 7. The slits 522 do not extend through the bottom wall 52 backwardly, thereby the vertical portions 4132, 4142 can be ward off by a rear inner wall of the slits 522 to prevent the whole slider 41 from moving backwardly. The top wall 51, bottom wall 52 and side walls 53, 54 each has at least a spring arm 55 extending forwardly into the receiving space 7 to resist or lock with the corresponding plug. The rear shell 6 is located at a rear side of the insulative housing 1 and engages with the metal shell 5.

Figure 4:
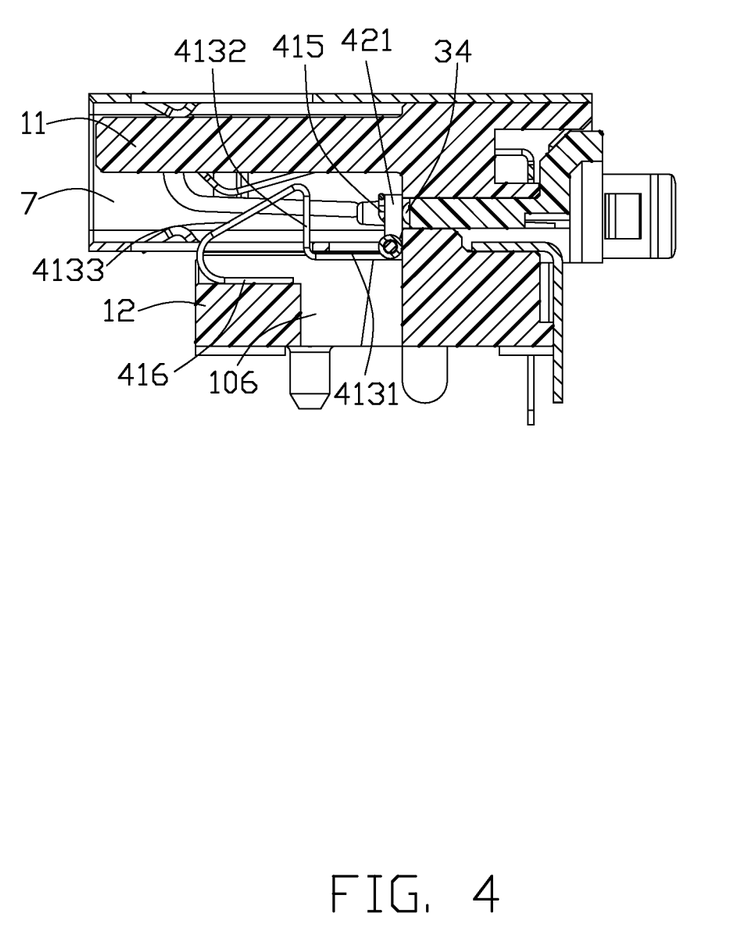
FIG. 4 is a cross sectional view taken along line IV-IV of FIG. 1 showing an internal structure of the optical connector when a corresponding plug is not inserted into the optical connector.
Figure 5:
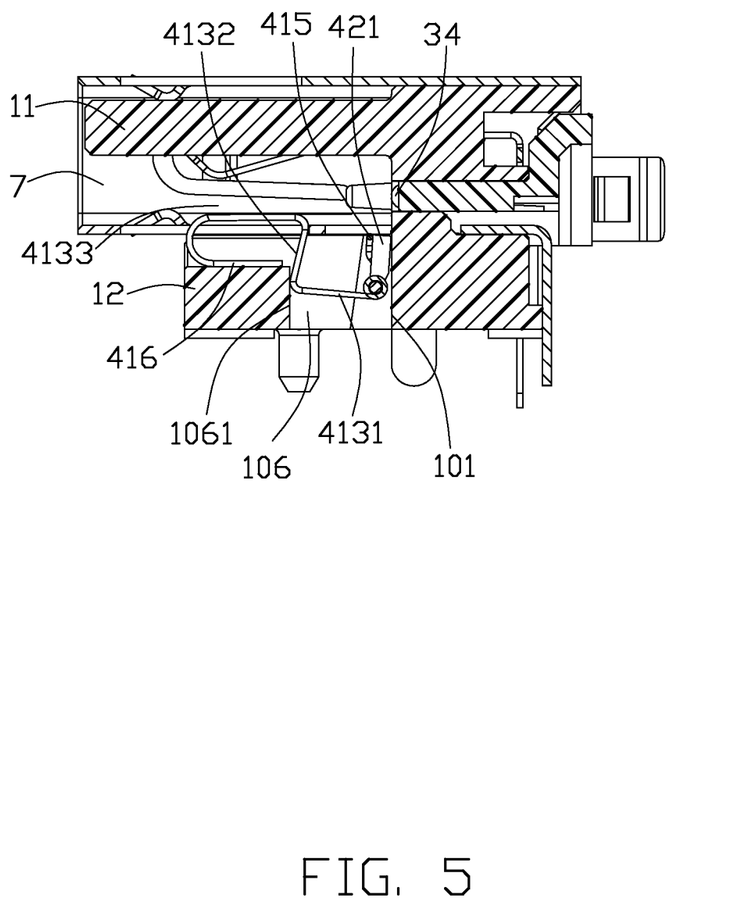
FIG. 5 is a view similar to FIG. 4 showing an internal structure of the optical connector when the plug is inserted into the optical connector.
Figure 6:
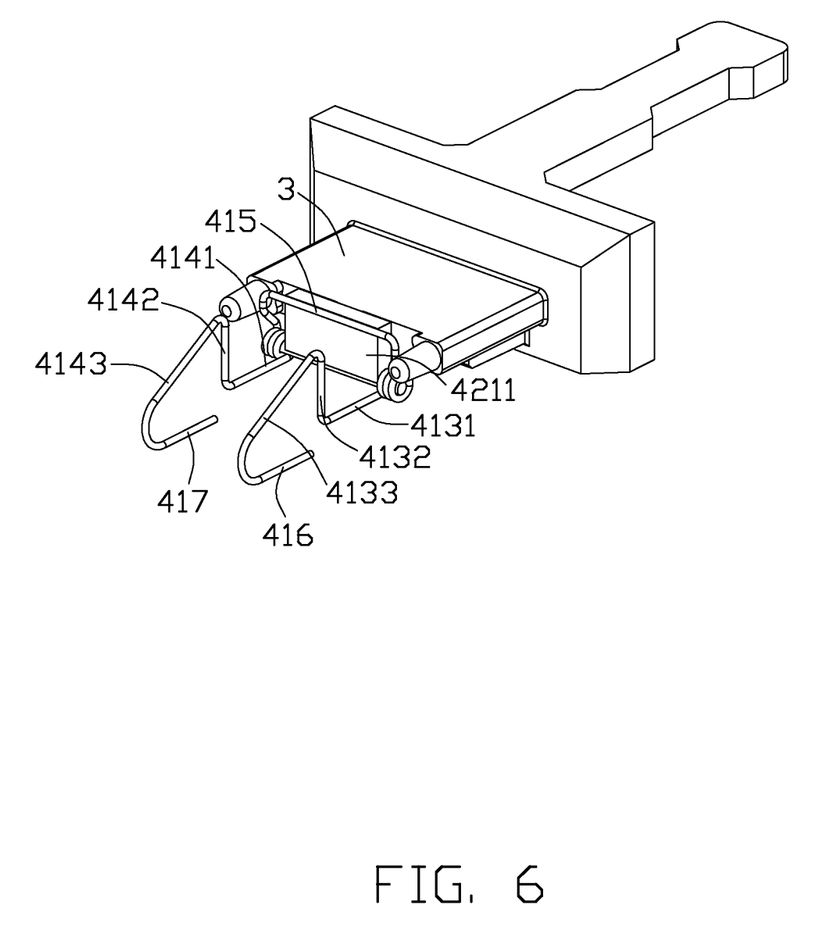
FIG. 6 is a perspective view of a protecting mechanism and an optical module of the optical connector.
Figure 7:
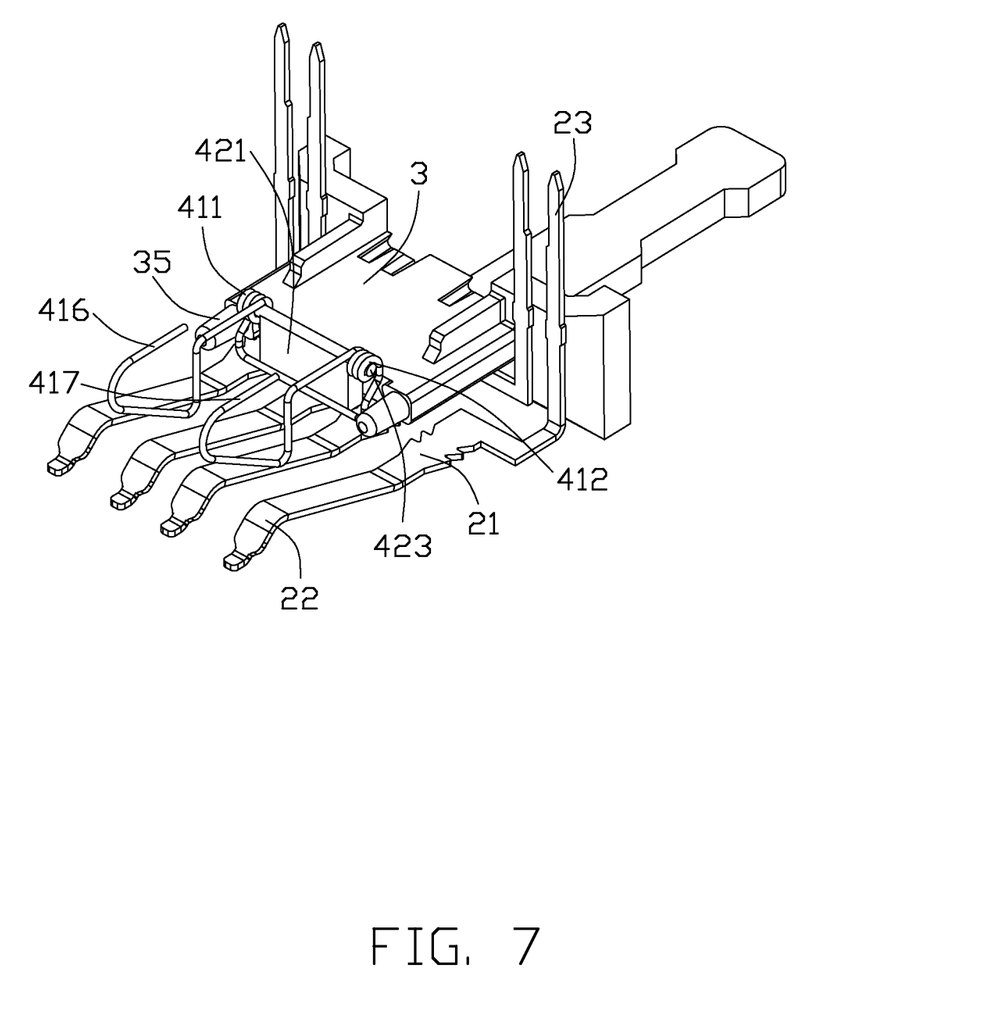
FIG. 7 is a perspective view of the protecting mechanism, the optical module and a plurality of contacts of the optical connector.

Referring to FIGS. 4 and 5, in an insertion process of the corresponding plug, the oblique portions 4133, 4143 are pressed to drive the other portions of the slider 4 except the positioning portions 416, 417 moving downwardly along a clockwise direction circle round an intersection of the oblique portions 4133, 4143 and the positioning portions 416, 417, at this time, the shield portion 421 is drove to rotate downwardly along the clockwise direction. In the rotating process of the protecting mechanism 4, the front surface 101 resists the shield portion 421 forwardly to make the resisting portion 415 deform forwardly; besides, when lower ends of the vertical portions 4132, 4142 move downwardly and forwardly contact a front inner side wall 1061 of the receiving cavity 106, the front inner side wall 1061 would resist the vertical portions 4132, 4142 backwardly to make the vertical portions 4132, 4142 deform backwardly. When the corresponding plug is fully inserted into the receiving space 7, the oblique portions 4133, 4143 downwardly move out of the receiving space 7 and are partly received in the slits 522, all the resisting portion 415, shield portion 421, pivots 422, 423 and coil portions 411, 412 move downwardly into the receiving cavity 106 and depart from the receiving space 7 to unveil the light receiving element 34 in said insertion direction, then the light receiving elements 34 are forwardly exposed to the receiving space 7.

When the USB 2.0 plug is fully inserted into the receiving space 7, the protecting mechanism 4 moves downwardly out of the receiving space 7, while the USB 2.0 plug only connects with the contact portions 22 of the contacts 2 electrically to transmit electrical signals therebetween. When the optical plug is fully inserted into the receiving space 7, the protecting mechanism 4 moves downwardly out of the receiving space 7, then the optical plug not only electrically connects with the contact portions 22 of the contacts 2 to transmit electrical signals therebetween, but also optically mates with the optical module 3 to transmit optical signals therebetween without any hindrance.

When the plug is pulled out of the receiving space 7, the first and second oblique portions 4133, 4143 rebound to drive the door 42 moving upwardly along an anticlockwise direction. Finally, the shield portion 421 returns to a preliminary status to shield the light receiving elements 34 and protect the light receiving elements 34 from being covered by dust or destroyed by other thing.

Of course, the protecting mechanism 4 can be alternatively designed to be hanged on the top wall of the metal shell, the protecting mechanism 4 lies in a vertical plane to cover the light receiving element 34 when the optical plug is not inserted into the receiving space 7, and rotates along an anticlockwise direction to horizontally joint against an inner side of the top wall to unveil the light receiving element 34, which also can reach the dustproof purpose.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An optical connector defining a receiving space for receiving a corresponding plug, comprising:
   an insulative housing having a base portion with a front surface at a rear side of the receiving space and a tongue forwardly extending from the front surface of the base;
   an optical module mounted to the insulative housing, the optical module having a light receiving element located behind the front surface and forwardly exposed to the receiving space;
   a protecting mechanism assembled in the receiving space, the protecting mechanism having a door lying in a vertical plane to shield the light receiving element along an insertion direction and an elastic slider linked with the door and having at least one abutting section located in front of the door, the at least one abutting section having an oblique portion obliquely protruding into the receiving space, the oblique portion deflecting downwardly when being pressed to bring the door to downwardly leave the receiving space.

2. The optical connector as claimed in claim 1, wherein the insulative housing defines a receiving cavity below the receiving space and communicates with the receiving space along a vertical direction, the at least one abutting portion has a connecting portion disposed between the door and the oblique portion, the connecting portion and the door moves into the receiving cavity when the plug is fully inserted into the receiving space.

3. The optical connector as claimed in claim 2, wherein the door has a shield portion to cover the light receiving element and a pair of pivots extending outwardly from two sides thereof, the slider has a pair of coil portions ringing on the pivots and a resisting portion resisting a front surface of the shield portion toward the front surface of the base, the slider has two said abutting portions, and each connecting portion extends forwardly from corresponding coil portion.

4. The optical connector as claimed in claim 3, wherein the insulative housing defines a mounting slot under the receiving space and near the front surface of the base to receive the coil portions and the pivots, the coil portions received in the mounting slot can not move along both the insertion direction and a transverse direction of the insulative housing.

5. The optical connector as claimed in claim 3, wherein the oblique portion obliquely extends backwardly and upwardly along the insertion direction for guiding and being pressed by the plug, the abutting portion further has a positioning portion connecting with a front end of the oblique portion and abutting against the insulative housing to prevent the whole slider from moving downwardly.

6. The optical connector as claimed in claim 5, wherein the positioning portion horizontally extends backwardly from the front end of the oblique portion.

7. The optical connector as claimed in claim 6, wherein the connecting portion comprises a level portion horizontally extending forwardly from the coil portion and a vertical portion extending upwardly from a front end of the level portion to join with a rear end of the oblique portion.

8. The optical connector as claimed in claim 7, wherein the oblique portion is pressed to rotate downwardly along a clockwise direction in an insertion process of the plug, the connecting portion, the coil portions and the door are driven to move downwardly into the receiving cavity and resist at least an inner side wall of the receiving cavity along the insertion direction.

9. The optical connector as claimed in claim 5, wherein the insulative housing has a standoff extending forwardly from a lower side of the front surface, the standoff is located below the receiving space and defines a pair of slots extending backwardly from a front wall thereof to retain the positioning portions, the receiving cavity passes through a rear end of the standoff along the vertical direction.

10. The optical connector as claimed in claim 5, wherein the optical module has a pair of posts extending into the receiving space from two sides of the light receiving element, the shield portion and the resisting portion are located between the posts along a transverse direction.

11. An optical connector, comprising:
an insulative housing having a tongue;
a metal shell covering the insulative housing and forming a receiving space with the tongue;
an optical module retained on the insulative housing and having a light receiving element forwardly exposed to the receiving space; and
a protecting mechanism located at a front side of the light receiving element to protect the light receiving element from being covered by dust;
wherein the protecting mechanism comprises a door shielding the light receiving element and a slider located in front of the door and catching the door, and the slider protrudes into the receiving space to be pressed downwardly and to drive the door to move downwardly out of the receiving space in an insertion process of a corresponding plug.

12. The optical connector as claimed in claim 11, wherein the slider has at least an oblique portion extending backwardly and upwardly along an insertion direction of a mating plug and a positioning portion bend from a front end of the oblique portion and abutting against the insulative housing to prevent the whole slider moving downwardly.

13. The optical connector as claimed in claim 12, wherein the door has a shield portion lying in a vertical plane to shield the light receiving element along the insertion direction and a pair of pivots extending outwardly from two sides of a lower end thereof, the slider has a pair of coil portions ringing on the pivots, a resisting portion extending upwardly from one end of the coil portion to resist a front side of the shield portion and a connecting portion connecting a rear end of the oblique portion and coil portions together, all the shield portion, pivots and coil portions are drove to move downwardly out of the receiving space to unveil the light receiving element when the plug is inserted into the receiving space and presses the oblique portion downwardly.

14. An optical connector comprising:
a housing defining a receiving space communication with an exterior in a front-to-back direction for receiving an optical plug;
an optical element located behind the receiving space;
a mating tongue located adjacent to the receiving space in a vertical direction perpendicular to said front-to-back direction;
a plurality of electrical contacts disposed in the housing with contacting sections exposed upon the mating tongue and facing the receiving space; and
a moveable protecting mechanism assembled around the receiving space and including a moveable door selectively shielding the optical element depending upon insertion or non-insertion of the optical plug; wherein
said protecting mechanism defines a moveable oblique portion located in front of the door and configured to be adapted to be engaged with the optical plug during mating to further actuate the moveable door for exposing the optical element.

15. The optical connector as claimed in claim 14, wherein once the oblique portion is pushed backwardly in said front-to-back direction by the optical plug, the door is actuated synchronically away from the mating tongue generally in another vertical direction opposite to said vertical direction.

16. The optical connector as claimed in claim 15, wherein said housing further defines a receiving cavity adjacent to the receiving space in said another vertical direction to receive the door when the optical plug is mated.

17. The optical connector as claimed in claim 16, wherein said receiving cavity extends through a bottom face of the housing via an injection molding process.

18. The optical connector as claimed in claim 14, wherein said receiving space is surrounded by a metallic shell which is attached to the housing, and said oblique portion extends through the shell in said vertical direction into the receiving space.

19. The optical connector as claimed in claim 11, wherein the insulative housing defines a receiving cavity under the receiving spacer to receive the door and the slider which move away from the receiving space, the slider is stamped from metal material and has a positioning portion at a front end thereof, an oblique portion extending upwardly and backwardly from the positioning portion, a coil portion surrounding a pivot of the door to connect the door with the slider and a connecting portion connecting the coil portion and a rear end of the oblique portion, when the oblique portion is pressed to downwardly deflect, the position portion always keeps downwardly abutting against the insulative housing.

20. The optical connector as claimed in claim 16, wherein the protecting mechanism further includes a vertical portion and a level portion both between the oblique portion and the door, and a bottom region of said vertical portion abuts against an inner side wall of the housing beside the receiving cavity to assure that the level portion and the associated door both move in said another vertical direction when the oblique portion is pushed backwardly by the optical plug during mating.

* * * * *